US012429147B2

(12) United States Patent
Ungerer

(10) Patent No.: US 12,429,147 B2
(45) Date of Patent: Sep. 30, 2025

(54) METHOD OF MONITORING A STATE OF A COMPONENT AND/OR A PROCESS VALUE, AND PROCESS VALVE

(71) Applicant: BUERKERT WERKE Gmbh & CO. KG, Ingelfingen (DE)

(72) Inventor: Andreas Ungerer, Ingelfingen (DE)

(73) Assignee: BUERKERT WERKE Gmbh & CO. KG, Ingelfingen (DE)

( * ) Notice: Subject to any disclaimer, the term of this patent is extended or adjusted under 35 U.S.C. 154(b) by 0 days.

(21) Appl. No.: 18/348,000

(22) Filed: Jul. 6, 2023

(65) Prior Publication Data

US 2024/0019044 A1    Jan. 18, 2024

(30) Foreign Application Priority Data

Jul. 12, 2022   (DE) .......................... 102022117369.0

(51) Int. Cl.
*F16K 37/00* (2006.01)
*G05B 23/02* (2006.01)

(52) U.S. Cl.
CPC ...... *F16K 37/0083* (2013.01); *G05B 23/0264* (2013.01); *G05B 23/0283* (2013.01)

(58) Field of Classification Search
CPC ............ G05B 23/0264; G05B 23/0283; F16K 37/0041; G07C 3/00
See application file for complete search history.

(56) References Cited

U.S. PATENT DOCUMENTS

| 5,538,036 | A | * | 7/1996 | Bergamini | ......... | G05D 16/2095 |
| | | | | | | 137/551 |
| 6,968,260 | B2 | | 11/2005 | Okada et al. | | |
| 9,720,423 | B2 | * | 8/2017 | Beck | ...................... | G05B 11/06 |
| 10,032,321 | B2 | * | 7/2018 | Lacaille | .................. | G06F 17/18 |
| 10,041,511 | B2 | * | 8/2018 | Beck | ...................... | F15B 19/005 |

(Continued)

FOREIGN PATENT DOCUMENTS

| DE | 10359603 | A1 | 8/2004 |
| DE | 102005037913 | A1 | 2/2007 |

(Continued)

*Primary Examiner* — Umashankar Venkatesan
(74) *Attorney, Agent, or Firm* — McNees Wallace & Nurick LLC

(57) ABSTRACT

A method of monitoring a state of a component and/or a process value including detecting and comparing at least one value characteristic of the state to be monitored with a defined value, and/or a process value, wherein, for each deviation of the detected value from the defined value, a mean value of the deviation or of the detected characteristic value is calculated and/or a maximum value and/or a minimum value and/or a count value is determined and first stored in a first storage cell within a preset first time interval. The further storage cells are successively filled in the same way for one respective preset time interval until all storage cells present are filled with a corresponding value. When all storage cells are filled, a mean value is formed from the values of respectively at least two storage cells filled immediately one after the other and is stored in a single storage cell, the previously stored value being overwritten, and the storage cells in which the previously stored value has not been overwritten being used for storing the subsequently detected values.

13 Claims, 3 Drawing Sheets

(56) References Cited

U.S. PATENT DOCUMENTS

| | | | |
|---|---|---|---|
| 10,359,771 B2 * | 7/2019 | Trainor | G08B 29/14 |
| 11,402,030 B2 * | 8/2022 | Beck | F16K 37/0083 |
| 11,710,560 B2 | 7/2023 | Wewers et al. | |
| 11,802,631 B2 * | 10/2023 | Fassbender | F16K 31/1635 |
| 2004/0122563 A1 | 6/2004 | Okada et al. | |
| 2013/0262172 A1 * | 10/2013 | Blumler | G06Q 10/06312 |
| | | | 705/7.22 |
| 2016/0071004 A1 * | 3/2016 | Salahshoor | G05B 23/0283 |
| | | | 706/2 |
| 2018/0163896 A1 * | 6/2018 | Mueller | F16K 37/0083 |
| 2021/0074418 A1 | 3/2021 | Wewers et al. | |
| 2021/0254750 A1 * | 8/2021 | Wagner-Stuerz | F16K 37/0083 |
| 2021/0373525 A1 * | 12/2021 | Beck | F16K 37/0041 |
| 2024/0219901 A1 * | 7/2024 | Nishizawa | G05B 23/0283 |

FOREIGN PATENT DOCUMENTS

| | | |
|---|---|---|
| DE | 102017114321 A1 | 1/2019 |
| DE | 102020210939 A1 | 3/2021 |

\* cited by examiner

METHOD OF MONITORING A STATE OF A COMPONENT AND/OR A PROCESS VALUE, AND PROCESS VALVE

FIELD OF DISCLOSURE

The present disclosure relates to a method of monitoring a state of a component, in particular a component in a process valve, to make a prediction about a future development of the state of the component, and to a process valve.

BACKGROUND

In many applications, it is desired to be able to make predictions as to when a particular component must be replaced, for example, due to wear. In this context, it is known to monitor certain parameters related to wear of the component. If the parameter changes over time, the change in the parameter can be used to make a prediction as to when wear has progressed to such an extent that replacement of the component is required. In addition, it is known to monitor process values, such as a number of pressure surges in a valve, a temperature in a motor, or values of a controller.

When monitoring the relevant parameters over a longer time period, which may be several years, large amounts of data are often generated. Since the storage space is usually limited in the devices in which the component to be monitored is installed or in which a process value occurs, the data acquired is read out for data processing and evaluated outside the device, for example on a computer.

However, there are cases of application in which it is desirable to be able to detect the development tendency directly at the device in question.

It is therefore an object of the present disclosure to reduce the amount of storage space required to acquire and evaluate the relevant data over a longer time period.

SUMMARY

According to example embodiments, this object is achieved by a method of monitoring a state of a component and/or a development of a process value, in particular a state of a component in a process valve or a process value of an installation to make a prediction about a future development of the state of the component and/or of the process value. In one step of the method, at least one value characteristic of the state to be monitored is detected and compared with a defined value, and/or a process value is detected. For each deviation of the detected value from the defined value, a mean value of the deviation or of the detected characteristic value is calculated and/or a maximum value and/or a minimum value and/or a count value is determined and first stored in a first storage cell within a preset first time interval. After expiry of the first preset time interval, a mean value of the deviation or of the detected characteristic value is calculated and/or a maximum value and/or a minimum value and/or a count value is also determined within a second preset time interval for each deviation of the detected value from the defined value, and stored in a second storage cell. After expiry of the second time interval, further storage cells are successively filled in the same way for one respective preset time interval until all storage cells present are filled with a corresponding value. When all storage cells are filled, a mean value is formed from the values of respectively at least two storage cells filled immediately one after the other, and is stored in a single storage cell, the previously stored value being overwritten, and the storage cells in which the previously stored value has not been overwritten being used for storing the subsequently detected values.

If several values are detected, for example a mean value of the deviation and a maximum value, preferably several storage cells are filled in parallel accordingly.

The method according to example embodiments has the advantage that a preset, relatively small storage space is sufficient to be able to always store values related to a development of the state of a component to be monitored or of the process value to be monitored in the existing storage cells. In other words, the preset storage space is sufficient to continuously store data over an unlimited time period.

In particular, the essence of the present disclosure is that the existing storage cells are overwritten as soon as all storage cells are filled with data, more specifically without losing the data detected up to that point. By forming a new value from the values of respectively at least two storage cells filled one immediately after the other, which in turn is stored in a single storage cell, the data acquired in a first pass are incorporated into a newly calculated value. If the acquired data is stored from the start in the form of a mean value, the required storage capacity of the individual storage cells is also small, as the previously stored value is always overwritten within a time interval. The same applies if only the maximum value or minimum value or count value occurring within a time interval is stored.

The storage cells in which the previously stored value has not been overwritten with a newly formed value at the end of a pass are preferably reset, that is, the data stored therein is deleted.

A pass is completed when the last storage cell is filled with a value and the time interval for filling the last storage cell has expired.

The values stored in the storage cells can be evaluated by means of a diagnostic unit, the diagnostic unit being adapted to make a prediction about a future development of the state of the component based on the values stored in the storage cells.

In particular, the manner how the value changes over a considered time period can be used to estimate when a certain state of the component will be reached.

Several different states of a component can also be monitored, with characteristic values of the different states being respectively stored in their own storage cells.

Likewise, several components and/or process values can be monitored separately.

Preferably, only critical values or developments are monitored and not a normal state in a process or in a process valve.

According to an example embodiment, the state to be monitored is a compression of a sealing element arranged on a valve tappet and cooperating with a valve seat, and the characteristic value is a position of the valve tappet. Based on a position of the valve tappet in a closed state of a process valve, it is possible to estimate how much the sealing element is compressed. The sealing element settles over time, which can eventually lead to leakage of the process valve. The further the position of the valve tappet deviates from a defined value, the more the sealing element has already settled. If the position of the valve tappet in a closed state of the process valve is observed over a longer time period, the change in position can be used to deduce when the sealing element will have settled so much that it has to be replaced.

In particular, the mean value of the position of the valve tappet increases the more the sealing element has settled, as the valve tappet must be moved further toward the valve seat to close the valve.

When monitoring the state of the sealing element, the position of the valve tappet is preferably not detected continuously, but only in the closed state of the valve.

Preferably, the position of the valve tappet is detected once during each closing process as soon as the valve is closed.

A process value to be monitored may be a characteristic variable of a component in a process valve or a characteristic variable in the process. Characteristic variables include wear, a case of failure, or a critical operating state which can be analyzed based on a tendency. For example, a process value is a temperature measured in a valve drive or a number of movements of a valve tappet in an end position or a value of a controller. For example, a maximum value of a temperature is stored in the storage cells, and each time a new maximum value occurs within a time interval, the previous value is overwritten. An increasing temperature indicates wear or malfunction of an electromotive valve drive. The number of movements of the valve tappet in an end position, also referred to as pressure surges, is stored in particular as a count value in the storage cells. A high number of pressure surges indicates a malfunction of the closing mechanism of the valve.

The time intervals within which the acquired values are stored in the same storage cell are preferably of equal length within a pass. As the time intervals are of equal length, it is particularly easy to read off a development from the stored values. For example, if the stored value changes by approximately the same amount in each time interval, it can be deduced from the stored values that a development continues continuously.

After each pass, the length of the time intervals may be increased, in particular multiplied. This is therefore advantageous, as in many applications, the state to be monitored changes more rapidly in an initial run-in phase than after a run-in phase. If the duration of the time intervals is too short, it could therefore happen that after a certain time, when the state to be monitored changes only slowly, it is no longer possible to read a tendency from the stored values.

For example, at least ten storage cells are provided. This allows enough values to be stored to reliably detect a development tendency, even if individual values deviate from the tendency. A further advantage of this number is that even at the beginning of a new pass, when a mean value has been formed from the values of at least two storage cells filled immediately one after the other, enough storage cells can be filled to be able to read off a tendency directly.

At the end of a pass, the storage cells are for example combined such that at least one fifth of the storage cells are already filled at the beginning of a new pass.

An optimum time period for replacing the component to be monitored may be predetermined by means of the development tendency derived from the stored values. It is thus ensured that the component to be monitored is replaced in time before a failure occurs. At the same time, it is avoided that the component is replaced unnecessarily early, which would lead to increased maintenance costs.

A detected value deviating maximally from the defined value may be displayed in a separate display. The reliability of the prediction may thus be increased. In particular, the maximum deviating value can serve as a plausibility check.

Furthermore, the exceeding of a defined maximum value may be an indication that an immediate replacement of the component is required.

For example, regardless of the development tendency, a warning signal occurs when the detected value exceeds a defined limit value. It is thus ensured that a user is made aware that the limit value has been exceeded and replaces the component in question.

After replacement of the component to be monitored and/or after maintenance based on the monitoring of a process value, all storage cells are preferably reset. In this way, the prediction about a state of the newly installed component or a process value is not falsified by the measured values detected in connection with the replaced component or the process value.

A maintenance based on a monitoring of a process value includes, for example, adjustment of a process system. However, it is also conceivable that a maintenance based on a monitoring of a process value also comprises a replacement of a component, for example if the process value is a temperature in the valve drive and the valve drive or a part of the valve drive is replaced during maintenance.

According to example embodiments, the object is further achieved by a process valve having a valve drive and a control head in which a control unit for controlling the valve drive, a diagnostic unit and at least one storage unit are accommodated, the storage unit having a plurality of storage cells which can be filled with data for monitoring a state of a component and/or a process value of the process valve in accordance with a method according to example embodiments, and the diagnostic unit being set up to read out the storage unit and to make a prediction about a future development of the state of a component and/or of a process value.

As already described in connection with the method, the process valve according to the present disclosure has the advantage that the storage space available in the storage unit is sufficient to store data continuously over an unlimited time period. It is thus possible to make a prediction about a future development of the state of the component directly in the process valve.

For example, the process valve comprises a position measuring system, wherein a position of a valve tappet of the process valve can be determined by means of the position measuring system. The position of the valve tappet in turn allows conclusions to be drawn as to which extent a sealing element attached to the valve tappet and cooperating with a valve seat has settled, as has already been described in connection with the method according to the present disclosure.

The position measuring system may also be located in the control head.

The present disclosure is not limited to process valves. In particular, the method according to example embodiments may also be applied in pumps or other field devices or in sensors.

BRIEF DESCRIPTION OF THE DRAWINGS

Further advantages and features of the present disclosure will become apparent from the following description and from the accompanying drawings to which reference is made and in which.

DETAILED DESCRIPTION

Figure 1:
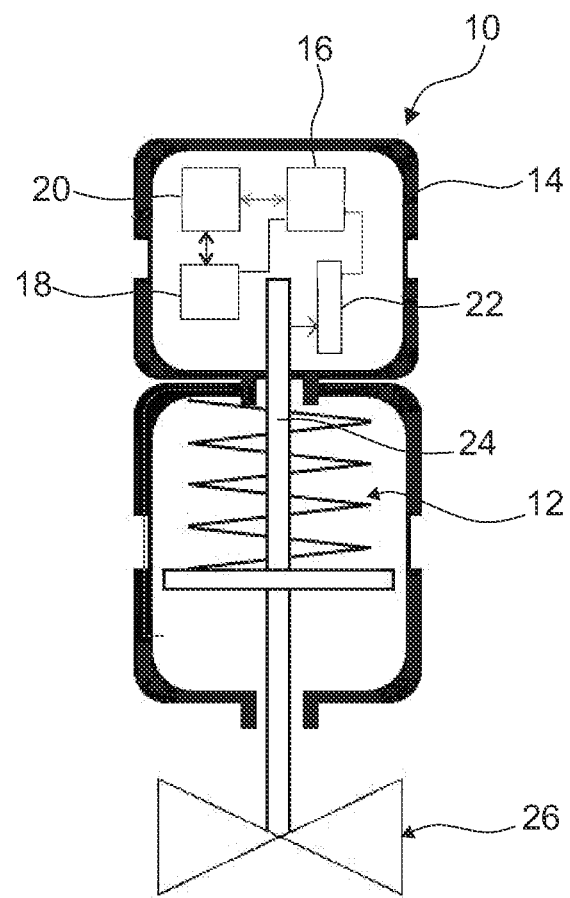
FIG. 1 shows schematically a process valve according to example embodiments.

The process valve 10 has a valve drive 12 and a control head 14, in which a control unit 16 for controlling the valve drive 12, a storage unit 18 and a diagnostic unit 20 are accommodated.

The valve drive 12 is, for example, an electromotive drive, a hydraulic drive, or a pneumatic drive.

The diagnostic unit 20 is arranged to read out the data stored in the storage unit 18.

The process valve 10 further comprises a position measuring system 22 used to determine a position of a valve tappet 24 of the process valve 10.

The position measuring system 22 is also located in the control head 14.

The valve tappet 24 is moved by the valve drive 12 to open or close a flow path through a fluid housing 26.

Figure 2:
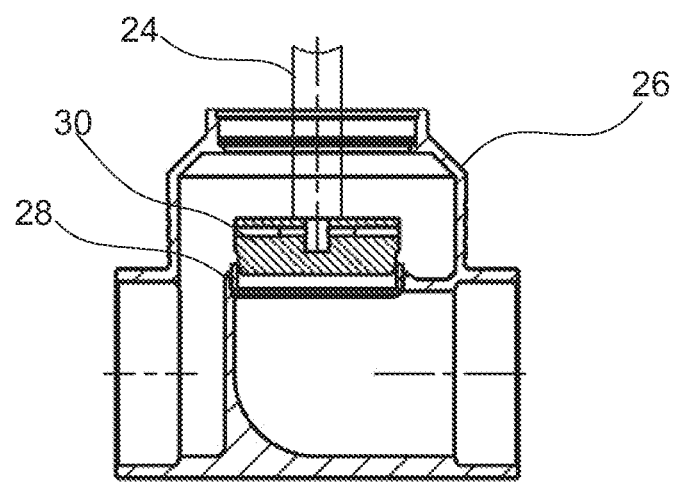
FIG. 2 shows a sealing assembly for the process valve.
Figure 3:
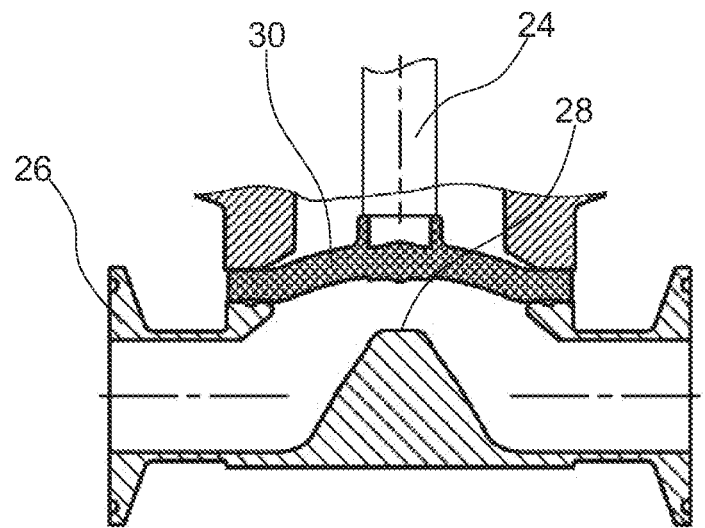
FIG. 3 shows a further sealing assembly for the process valve.
Figure 4:
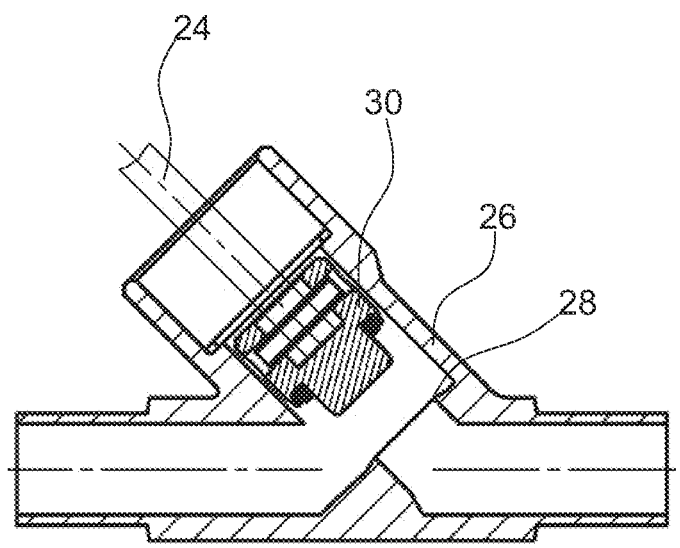
FIG. 4 shows a further sealing assembly for the process valve.
Figure 5:
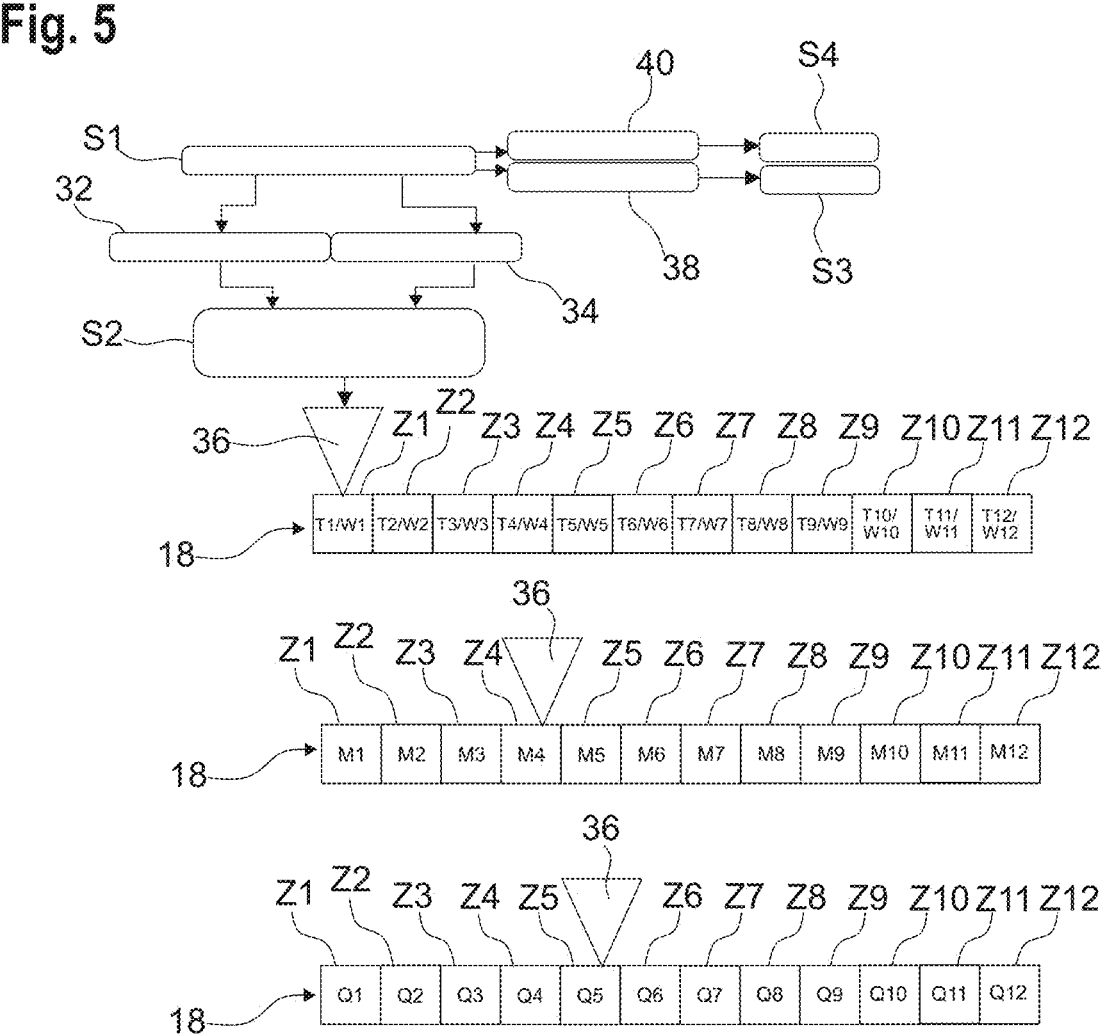
FIG. 5 shows a flow diagram illustrating a method according to example embodiments.

Various possible embodiments of a fluid housing 26, which is only schematically indicated in FIG. 1, are shown in FIGS. 2 to 4.

A valve seat 28 is formed in the fluid housing 26.

The valve tappet 24 is moved by the valve drive 12 to press a sealing element 30 arranged at one end of the valve tappet 24 against the valve seat 28 and thus close the flow path through the fluid housing 26.

The sealing element 30, which is often formed of a resilient material, can wear overtime, resulting in undesirable leaks.

In particular, the material of the sealing element 30 settles over time, so that the valve tappet 24 must initially be moved more and more toward the valve seat 28 to completely close a flow path until leakage may eventually occur.

It is therefore desirable to know in advance when the sealing element 30 needs to be replaced to prevent leakage from the outset.

To this end, a state of the sealing element 30 is monitored to make a prediction about a future development of the state of the sealing element 30.

In this regard, all data acquired in connection with the monitoring of the state of the sealing element 30 is stored in the storage unit 18.

A method of monitoring the state of the sealing element 30 is described with reference to FIG. 3.

In a step S1, a value characteristic of the state of the sealing element 30, which in the example embodiment is the position of the valve tappet 24, is detected and compared with a defined value. Specifically, the characteristic value in the example embodiment is the end position of the valve tappet 24 in a closed state of the process valve 10.

The defined value is detected, for example, when the process valve 10 is actuated for the first time, when the sealing element 30 is still in a new state.

The end position of the valve tappet 24 is detected during each closing operation.

Within a first preset time interval, a mean value of the detected value is calculated and initially stored in a first storage cell Z1 of the storage unit 18 for each deviation of the detected value from the defined value.

More precisely, a counter 32 counts the number of deviations, and the end positions of the valve tappet 24 are summed up and stored in a temporary storage 34. Then, in a step S2, the value stored in the temporary storage 34 is divided by the number of deviations.

In an alternative embodiment, a mean value of a deviation of the detected value from the defined value is formed in step S2.

In a further embodiment, it is possible to store a maximum value of the deviation or a maximum deflection.

Step S2 is performed whenever the number detected in the counter 32 increases.

The counter 32 and the temporary storage 34 are connected to a respective selected storage cell via a switch 36, for example.

At the beginning of the method, the switch 36 selects the storage cell Z1.

When the first time interval has elapsed, the switch 36 advances to the storage cell Z2.

The advancement of the switch 36 occurs automatically after expiry of the first time interval.

Preferably, the control unit 16 is set up to control the switch 36.

After expiry of the first time interval, the storage cell Z2 is filled within a second preset time interval in the same manner as the first storage cell.

However, the counter 32 and the temporary storage are reset prior to this.

The same applies to the further storage cells Z3 to Z12.

The duration of the time intervals is stored in the control unit 16.

For example, the duration of the time intervals in the first pass is one day or one week. Therefore, the values entered in the storage cells Z1 to Z12 are designated T1 to T12 respectively W1 to W12.

The duration of the time intervals can however be selected arbitrarily, a time duration which is reasonable for the corresponding case of application being selected.

However, the time intervals within which the detected values are stored in the same storage cell are of equal length, at least within the first pass.

According to an optional embodiment, when all storage cells have been filled, in particular filled for the first time, a new mean value is formed from the values of respectively at least two, in the example embodiment four storage cells filled directly one after the other.

Specifically, in the example embodiment, a mean value M1 is formed from the values W1 to W4, a mean value M2 from the values W5 to W6, and a mean value M3 from the values W9 to W12.

The mean values M1 to M3 are then stored in the storage cells Z1 to Z3, the previously stored values W1 to W3 being overwritten.

As in the example embodiment the values of four weeks were respectively summarized, the values stored in the storage cells Z1 to Z3 correspond to the values of one month.

The storage cells Z4 to Z12 in which the previously stored value has not been overwritten are reset and used to store the subsequently detected values.

For a better explanation of the storage operations, the storage cells Z1 to Z12 are shown several times in FIG. 3. However, in the example embodiment, the storage unit 18 actually comprises only twelve storage cells Z1 to Z12.

As in the second pass, the storage cells Z1 to Z3 are already filled with newly calculated mean values, the switch 36 starts at the storage cell Z4 in the second pass.

The storage cells Z1 to Z12 are filled one after the other in a constant and fixed sequence in each pass.

In the second pass, the duration of the time intervals for which one storage cell is respectively filled is increased.

In the example embodiment, the duration of the time intervals increases from one week to one month after the first pass.

It is conceivable that the values of a week are initially detected and stored in four storage cells, from the values of which a mean value for a month is then formed. For example, a mean value for a week is stored in each of the storage cells Z4 to Z7, with the value M4 being formed from the temporarily stored values after the fourth week has elapsed and stored in the storage cell Z4. This has the advantage that more measured values are available at a current time. However, this procedure only works as long as enough storage cells are free, i.e. in the example embodiment at most up to the value M9.

When the second pass is completed, the procedure is repeated accordingly, wherein in the third pass, a quarterly value Q1 is formed from the values M1 to M3, a quarterly value Q2 is formed from the values M4 to M6, a quarterly value Q3 is formed from the values M7 to M9, and a quarterly value Q4 is formed from the values M10 to M12.

Switch 36 starts accordingly at the storage cell Z5 in the third pass.

In the next pass, four quarterly values can respectively be combined to form a year value, and the process can be repeated accordingly.

The values stored in the storage cells Z1 to Z12 can be evaluated at any time by the diagnostic unit 20 to derive a development tendency from the values, i.e. to make a prediction about how the state of the sealing element 30 will develop in the future.

Based on this prediction, an optimum time period for a replacement of the sealing element 30 may be predetermined.

In addition, in a separate display 38, for example, a detected value deviating maximally from the defined value can be displayed and/or output as a warning signal S3 if the detected value falls below or exceeds a defined limit value.

Regardless of the development tendency, a warning signal can be issued if the detected value exceeds a defined limit value.

For example, a number of the total detected values is stored in an additional storage 40, with a warning signal S4 occurring when an empirical value is reached.

In general, it is conceivable that several values are stored in parallel. In this case, several storage units 18 are provided accordingly.

For example, an additional storage unit is provided, not shown in the figures for simplicity, to detect additional parameters, for example a number of cycles or a count value in a time interval.

Indeed, it is not necessarily the case that the same number of values are detected in each time interval. With reference to the application example, a different number of closing operations may take place in the different time intervals.

However, the counter 32 is reset after each time interval. Therefore, the diagnostic unit 20 cannot read the number of closing operations that have occurred from the mean values stored in the storage cells Z1 to Z12.

In an additional storage unit, storage cells can therefore be filled with values, in particular a number of cycles, in parallel with the storage cells Z1 to Z12 of the first storage unit.

Further alternatively or additionally, a maximum value and/or a minimum value occurring in a time interval can be detected.

In the described example embodiment, the monitoring of the state of a sealing element 30 of a process valve 10 is described, but the method according to the present disclosure can also be transferred to other cases of application, for example the monitoring of the wear of an electromotive valve drive, an actuator of a pump, a process value of a sensor or for monitoring a number of movements of the valve tappet in an end position.

Figure 6:
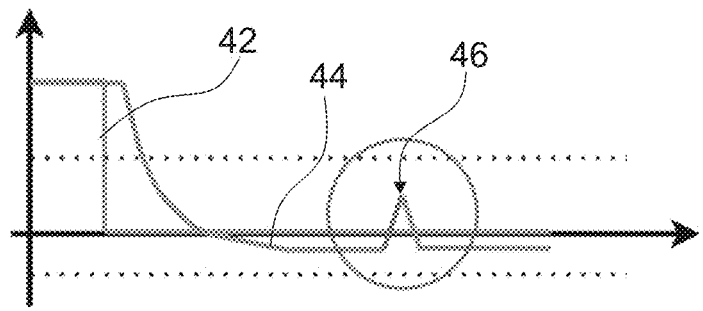
FIG. 6 shows a position of a valve tappet over time.

FIG. 6 illustrates a progression of the position of the valve tappet 24 during a closing operation, with a curve 42 illustrating an ideal state of the position of the valve tappet 24 and the curve 44 illustrating an actual position of the valve tappet 24.

As can be seen from the curve 44, in reality the valve tappet 24 is moved further towards the valve seat 28 in its closed position than in the ideal case, as the sealing element has already settled.

In addition, FIG. 6 also illustrates a pressure surge 44 in which the valve tappet is deflected by a pressure increase of the fluid.

A sealing closure range is illustrated by means of dotted lines. When the valve tappet 24 moves within the sealing closure range, the process valve 10 is reliably sealed.

For example, the number of pressure surges 44 is detected as a process value.

If the number of pressure surges 44 exceeds a limit value within a time interval, this is an indication that maintenance of the installation is required, for example by adjusting the pressure conditions.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of monitoring a state of a component, the method comprising:
   detecting and comparing at least one value characteristic of the state to be monitored with a defined value, wherein:
   for each deviation of the detected value from the defined value, a mean value of the deviation or of the detected characteristic value is calculated and first stored in a first storage cell within a preset first time interval,
   after expiry of the first preset time interval, a mean value of the deviation or of the detected characteristic value is calculated within a second preset time interval for each deviation of the detected value from the defined value and stored in a second storage cell,
   after expiry of the second time interval, further storage cells are successively filled in the same way for one respective preset time interval until all storage cells present are filled with a corresponding value, and/or when all storage cells are filled, a new value is formed from the values of respectively at least two storage cells filled immediately one after the other and is stored in a single storage cell, the previously stored value being overwritten, and the storage cells in which the previously stored value has not been overwritten being used for storing the subsequently detected values, and making a prediction of a future development of the state of the component.

2. The method according to claim 1, wherein the state to be monitored is a compression of a sealing element arranged on a valve tappet and cooperating with a valve seat, and the characteristic value is a position of the valve tappet.

3. The method according to claim 1, wherein the process value to be monitored is a characteristic variable of a component in a process valve or a characteristic variable in the process.

4. The method according to claim 1, wherein the time intervals within which the detected values are stored in the same storage cell are of equal length within one pass.

5. The method according to claim 1, wherein the storage cells are filled successively in a constant and fixed sequence during each pass, and the duration of the time intervals for which one storage cell is respectively filled is increased in each new pass.

6. The method according to claim 1, wherein at least ten storage cells are present.

7. The method according to claim 1, wherein an optimum time period for a replacement of the component to be monitored is predetermined by means of the development tendency derived from the stored values.

8. The method according to claim 1, wherein a detected value deviating maximally from the defined value is displayed in a separate display.

9. The method according to claim 1, wherein a warning signal is given independently of the development tendency if the detected value exceeds a defined limit value.

10. The method according to claim 1, wherein after replacement of the component to be monitored and/or after maintenance based on a monitoring of a process value, all storage cells are reset.

11. A process valve having a valve drive and a control head in which a control unit for controlling the valve drive, a diagnostic unit and at least one storage unit are accommodated, the storage unit having a plurality of storage cells which can be filled with data for monitoring a state of a component and/or a process value of the process valve in accordance with a method according to claim 1, and the diagnostic unit being set up to read out the storage unit and to make a prediction about a future development of the state of a component and/or a process value.

12. The process valve according to claim 11, wherein the process valve comprises a position measuring system, wherein a position of a valve tappet of the process valve can be determined via the position measuring system.

13. A method of monitoring a state of a component and/or a development of a process value, wherein detecting and comparing at least one value characteristic of the state to be monitored with a defined value, and/or a process value, wherein:

for each deviation of the detected value from the defined value, a mean value of the deviation or of the detected characteristic value is calculated and/or a maximum value and/or a minimum value and/or a count value is determined and first stored in a first storage cell within a preset first time interval, after expiry of the first preset time interval, a mean value of the deviation or of the detected characteristic value is calculated and/or a maximum value and/or a minimum value and/or a count value is also determined within a second preset time interval for each deviation of the detected value from the defined value and stored in a second storage cell, after expiry of the second time interval, further storage cells are successively filled in the same way for one respective preset time interval until all storage cells present are filled with a corresponding value, and/or when all storage cells are filled, a new value is formed from the values of respectively at least two storage cells filled immediately one after the other and is stored in a single storage cell, the previously stored value being overwritten, and the storage cells in which the previously stored value has not been overwritten being used for storing the subsequently detected values, wherein the state to be monitored is a compression of a sealing element arranged on a valve tappet and cooperating with a valve seat, and the characteristic value is a position of the valve tappet, and wherein a prediction of a future development of the state of the component and/or of the process value is made.

* * * * *